Aug. 21, 1951 R. M. MERCIER 2,564,765
DEVICE FOR BREAKING-UP FOAM AND FROTH
Filed March 17, 1948 3 Sheets-Sheet 1

Inventor:
Robert Maurice Mercier
by Michael S. Striker
Agent

Aug. 21, 1951 R. M. MERCIER 2,564,765
DEVICE FOR BREAKING-UP FOAM AND FROTH
Filed March 17, 1948 3 Sheets-Sheet 2

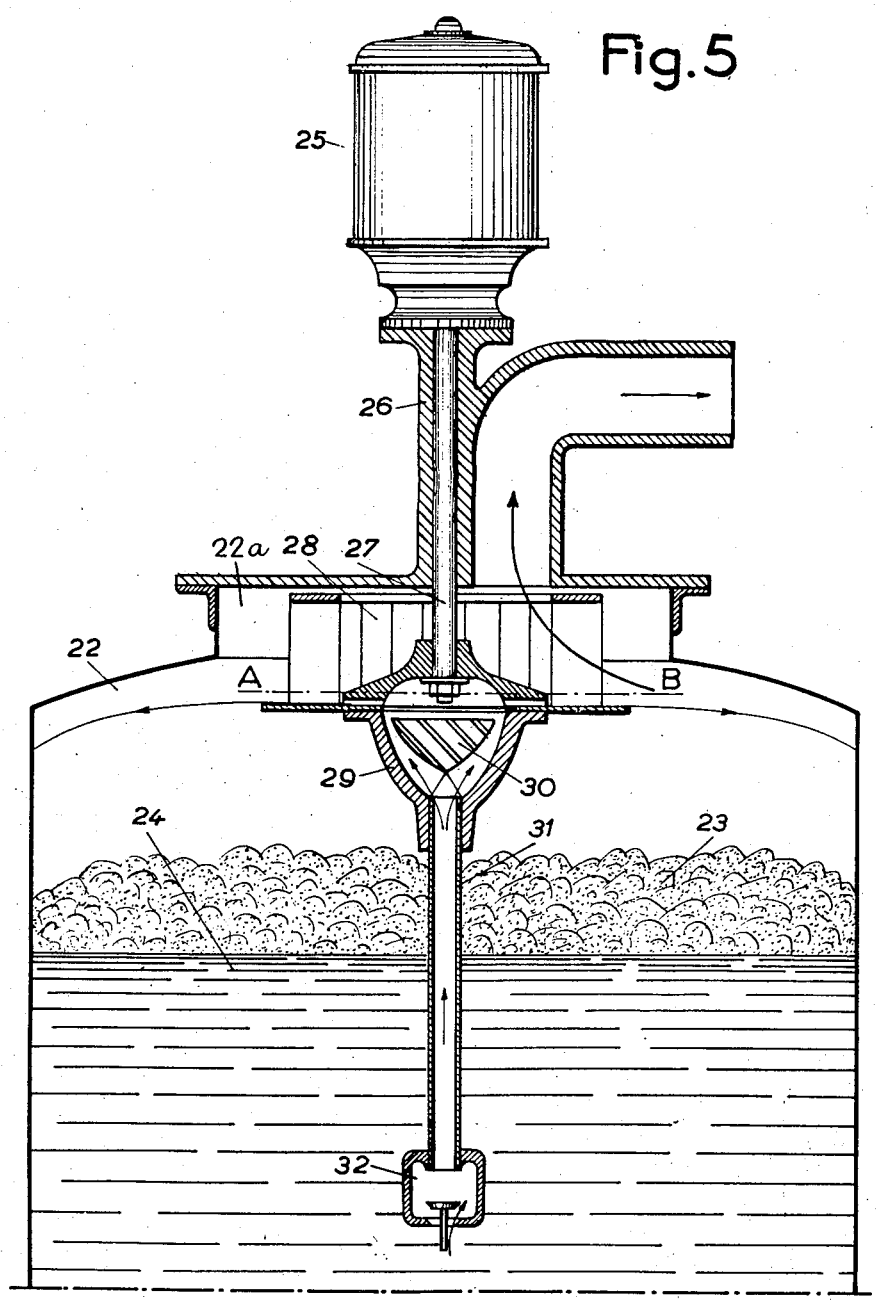

Patented Aug. 21, 1951

2,564,765

UNITED STATES PATENT OFFICE 2,564,765

DEVICE FOR BREAKING UP FOAM AND FROTH

Robert Maurice Mercier, Paris, France

Application March 17, 1948, Serial No. 15,476
In France March 17, 1947

13 Claims. (Cl. 252—361)

The present invention relates to improvements in devices for destroying or breaking up froth and foam and in the uses of such improved devices.

Froth and foam is formed by an agglomeration of gas or vapour bubbles enwrapped in films or liquid, the surface tension properties or said liquid films making for the persistency of said bubbles. Froth and foam are particularly adapted to form whenever a gas or a vapour is given out from the body of a liquid which has a high surface tension, either as a result of the introduction of said gas into the liquid as in bubbling a gas through a body of liquid or agitating said liquid with a stream of gas, or else because of the formation of the gas in situ within the liquid, as in a chemical reaction or a fermentation process, or finally as a result of the formation of the vapour within the body of the liquid (as in vaporization).

Froth and foam whether produced in a sealed enclosure or in an open tank or the like are always somewhat troublesome and their occurrence is particularly objectionable whenever it is desired to recover the gas or vapour which has generated it, or when the operation during which it has occurred requires a release or the gas or the vapour to the free atmosphere. Moreover inasmuch as the specific gravity of foam is in the order of $\frac{1}{10}$ only of that of the generating liquid, considerable loss in liquid is incurred whenever foam spills out over the walls of the enclosure.

It has been attempted to suppress the formation of foam through acting on the surface tension of the generating liquid as by adding fatty substances thereto, but the use of such substances is costly, since they are not always adapted to be recovered and furthermore they may adversely affect the final product to which they have been added, as by conferring an objectionable taste to food products for instance.

It has also been attempted to effect the suppression of foam through the use of mechanical devices to which movement is imparted over the free surface of the liquid throughout nearly the entire area thereof.

It is a general object of the present invention to provide an improved device of mechanical character effective to destroy or disrupt foam and froth.

It is an object of the invention to provide an improved foam disrupting means operative to break up the foam bubbles, throw back the liquid constituent thereof into the container in which said liquid is maintained while allowing the substantially dry gas to be evacuated outwardly.

A more specific object of the invention is to provide such a foam suppressing device which comprises a rotor member rotated at high speed in a capacity in which foam is adapted to form or into which foam is conducted, the dimensions of said rotor being relatively small as compared to the capacity of said container, and said rotor being located in front of the outlet for the gases enwrapped in said foam, said rotor being adapted to impart impacts to the envelopes of the bubbles forming said foam thereby breaking up said bubbles and through the action of centrifugal force throw back the liquid constituent of said bubbles into capacity without the effect of said centrifugal force hindering the outlet of the gases or vapour.

According to another specific object of the invention the above described device may be provided with a pumping means associated with said rotor and operating simultaneously therewith so as to participate in the destruction of the foam by means of the liquid jets delivered by said pumping means. Said pumping means is operative to create a sheet of liquid droplets participating in the disruption of the foam surrounding the device. Further objects of the invention relate to the use of the above specified apparatus in connection with tanks, containers or enclosures of any type, whether opened or sealed, in commercial plants or in laboratories, wherein or whereinto foam is adapted to form or to be conducted, and more specifically in connection with tanks or chemical reactors for use in distillation, fermentation, vaporization, chemical processing and other operations.

I will now describe merely for purposes of exemplification and not of limitation of the scope of my invention, some specific forms of embodiment thereof, with reference to the accompanying drawings given also by way of illustration and not of limitation and wherein:

Fig. 5 illustrates an alternative construction for the whole apparatus,

Figure 1:
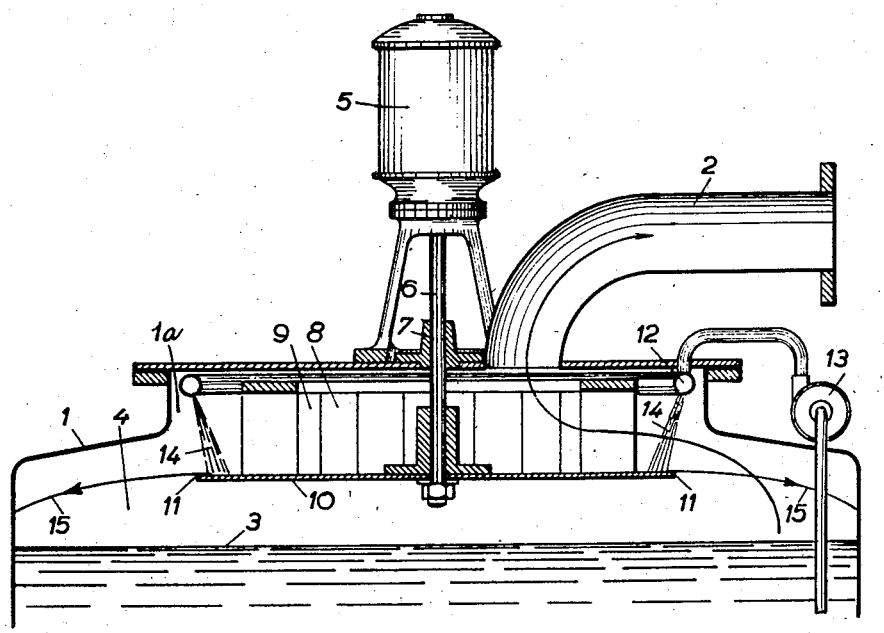
Fig. 1 shows an elevational and partly a cross sectional view of a defoaming apparatus according to my invention.

First referring to Fig. 1 the tank 1 has an upper portion designed as a cylindrical chamber 1a arranged coaxially with the tank 1 and having a smaller diameter than the latter. The tank 1 contains both liquid and foam, the outlet conduct 2 being constructionally designed for the outflow of the gas or vapor which it is desired, as the case may be to remove or to recover; the liquid level within the tank is shown at 3, and consequently the capacity 4 may be filled with foam or froth which it is desired, according to the invention to destroy before it has reached the mouth of the outlet conduct 2.

The apparatus forming the subject of this invention comprises an electrical or mechanical motor 5 the speed of operation of which is suitably predetermined according to the particular type of liquid being treated and similar factors.

The motor shaft 6 extends through a tight sealing bushing 7 into the tank. Said shaft has secured thereon a rotor structure 8 composed of blades or vanes 9 similar to the blade structure of a fan, an end plate 10 of the rotor being formed of a solid metal sheet projecting radially beyond the blades to form a peripheral radial flange 11.

An annular perforate tube 12 suppiled from a pump 13 which draws up the liquid from the tank is adapted to direct a series of spaced jets of liquid 14 upon the rotor flange 11 which deflects them outwardly to form a liquid sheet 15.

The above described device operates as follows:

Whenever there is an intense formation of foam, the entire capacity 4 defined between the liquid surface 3 and the top dome or roof of the tank becomes filled with foam which tends to be evacuated progressively as the gas evolves, through the outlet 2. Said foam however in order to reach the mouth of the outlet 2 has to pass through the blades of the rotor 8. The rapid movement of the blades imparts violent impacts to said foam disrupting the liquid envelopes of the constituent bubbles thereof. The liquid forming said bubbles then adheres through surface tension to the surface of said blades, moves down along said surface under the effect of gravity and is finally evacuated through the outer flange 11 of the rotor end-plate 10 under the action of centrifugal force thus going to form part of the above mentioned liquid sheet 15, operative to destroy any foam encountered along its path of travel. On the other hand the gas released through the disruption of the liquid envelopes of the bubbles freely flows through the blades 9 and is evacuated through the rotor into the outlet 2.

Figure 2:
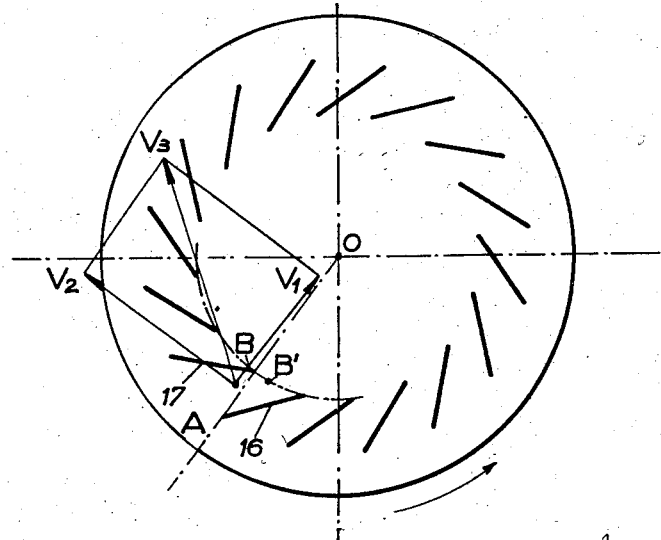
Fig. 2 is a diagrammatic showing of the arrangement of the blading of the rotor according to the invention.

Fig. 2 shows the general layout and action of the rotor blades. Considering two adjacent blades 16 and 17 it will be seen that as a gas bubble penetrates through the blades at a speed of flow V1, its relative speed with respect to the blades, in view of the peripheral speed V2 of the rotor will be V3.

It will readily appear from this diagram that in order for any gas bubble to be broken up by the blades irrespective of its speed upon entering into the blade structure, it is necessary and sufficient that the peripheral edge A of the blade 16 be located on the same radius BO as the inner edge B of the next blade 17. The desired result will be still more certainly achieved if the blade 17 is in overlapping relationship with blade 16, that is if the edge B is at B' for instance.

Figure 3:
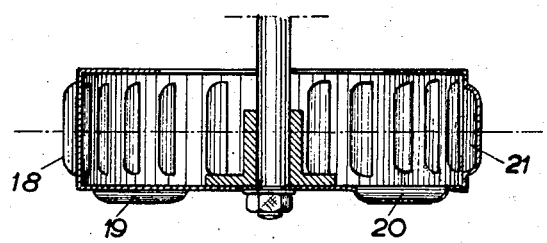
Fig. 3 illustrates a first modification of the rotor shown in Fig. 1.

Fig. 3 illustrates a modification of the blading system for the rotor. In this form of construction the rotor comprises a perforate sheet metal basket the peripheral and bottom walls of which are perforated and to form a so-called louvre structure.

The angular setting of said swaged louvres illustrated at 18, 19, 20, 21 is disposed according to a general principle to that shown in Fig. 2.

Figure 4:
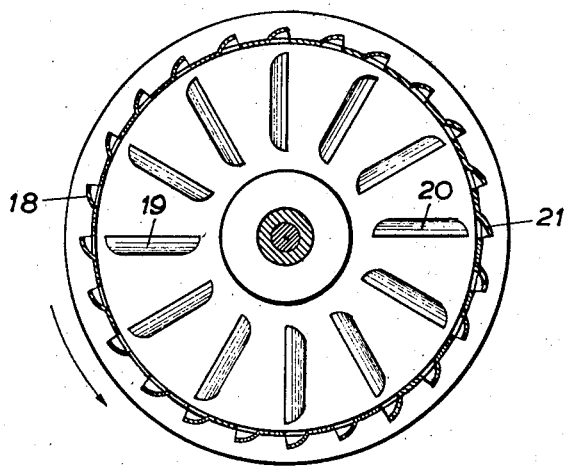
Fig. 4 is a cross section along the line A—B of Fig. 3.
Figure 6:
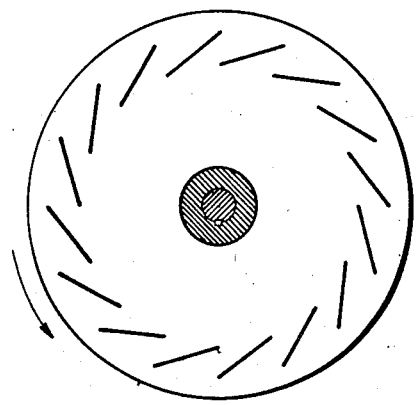
Fig. 6 is a cross section along the line A—B of Fig. 5.

Fig. 4 is a cross section along the line A—B of Fig. 3. In Fig. 4 the vertical louvers are shown at 18 and 21 and the horizontal louvers at 19 and 20.

A further exemplary embodiment of the invention is shown in Fig. 5. In that figure there is shown an open tank or container 22, containing both liquid and foam 23 up to a certain level in excess of the liquid level 24. The tank 22 has at its upper end a cylindrical chamber 22a which has a smaller diameter than the tank 22 and is arranged coaxially with the latter.

The electric motor 25 supported on a fixed or a rotatable frame, not shown, is provided with a depending bushing 26 preferably having a fluid-tight seal associated therewith to guide and support the extension of the motor shaft 27 has secured on the lower end thereof a rotor 47 wherein the blades are arranged along generatrices which may be radially directed or at an angle. Said rotor in turn supports a depending generally conical capacity 29 the base 30 of which forms the blade structure of a centrifugal pump.

The bottom of the conical capacity 29 comprises an intake conduct 31 provided with a check-valve 32.

It will of course be understood that depending on the nature of the foam to be treated the dimensions of the tank and other factors, the relative importance of the rotor structure and the pump structure in the apparatus may be varied between the case of the apparatus comprising a rotor and no pump to that of the apparatus including a pump and no rotor.

Inasmuch as quite frequently the formation of foam is intermittent and that continual operation of the device would be superfluous and expensive, it is contemplated according to the invention to provide for the automatic starting and stopping of the device. It will of course be understood that the forms of embodiment illustrated and described may be subjected to any additions, variations and omissions as may appear to the man of the art, without exceeding the scope of the invention as defined in the ensuing claims.

What I claim as my invention and desire to secure by Letters Patent is:

1. A defoaming device comprising in combination a tank; a cylindrical chamber arranged at the upper end of said tank; a lid closing the upper end of said chamber and having an opening eccentrically arranged close to the center of said lid; a rotor rotatably arranged with its axis vertical in said cylindrical chamber close to said lid and projecting downwardly beyond said chamber; said rotor having an appreciably smaller diameter than said chamber; a plate rigidly connected to the lower end of said rotor and having a flange projecting laterally beyond said rotor; means arranged above said plate for generating a shower of liquid on said plate; a centrifugal pump for the liquid arranged below said plate coaxially with said rotor and adapted to be driven by said rotor; and a pipe connected to said pump and having an entrance opening adapted to be immersed in the liquid.

2. A defoaming device comprising in combination a tank; a cylindrical chamber arranged at the upper end of said tank; a lid closing the upper end of said chamber and having an opening eccentrically arranged close to the center of said lid; a rotor rotatably arranged with its axis vertical in said cylindrical chamber close to said lid and projecting downwardly beyond said chamber; said rotor having an appreciably smaller diameter than said chamber; a plate rigidly connected to the lower end of said rotor and having a flange projecting laterally beyond said rotor; means arranged above said plate for generating a shower of liquid on said plate; a centrifugal pump for the liquid arranged below said plate coaxially with said rotor and adapted to be driven by said rotor; a pipe connected to said pump and having an entrance opening adapted to be immersed in the liquid; and a non-return valve arranged at said entrance opening.

3. A defoaming device comprising in combination a tank; a cylindrical chamber arranged at the upper end of said tank; a lid closing the upper end of said chamber and having an opening eccentrically arranged close to the center of said lid; a rotor rotatably arranged with its axis vertical in said cylindrical chamber close to said lid and projecting downwardly beyond said chamber; said rotor having an appreciably smaller diameter than said chamber; a plate rigidly connected to the lower end of said rotor and having a flange projecting laterally beyond said rotor; means arranged above said plate for generating a shower of liquid on said plate; a centrifugal pump for the liquid arranged below said plate coaxially with said rotor and adapted to be driven by said rotor; a pipe connected to said pump and having an entrance opening adapted to be immersed in the liquid; a non-return valve arranged at said entrance opening; and an electric motor coaxially arranged with said rotor and said pump above said lid for driving said rotor and said pump.

4. A defoaming device comprising in combination a tank; a cylindrical chamber arranged at the upper end of said tank; a lid closing the upper end of said chamber and having an opening eccentrically arranged close to the center of said lid; a rotor rotatably arranged with its axis vertical in said cylindrical chamber close to said lid and projecting downwardly beyond said chamber; said rotor having an appreciably smaller diameter than said chamber; a plate rigidly connected to the lower end of said rotor and having a flange projecting laterally beyond said rotor; means arranged above said plate for generating a shower of liquid on said plate; a centrifugal pump for the liquid arranged below said plate coaxially with said rotor and adapted to be driven by said rotor; and a device for admitting liquid to said pump; said device being rotatable together with said pump.

5. A defoaming device comprising, in combination, a cylindrical tank, a cylindrical chamber arranged at the upper end of said tank and having a smaller diameter than said tank; a top wall closing the upper end of said cylindrical chamber and having an opening formed therein and arranged eccentrically close to the center of said top wall; a rotor arranged partly in said cylindrical chamber and partly in said cylindrical tank rotatably about a vertical axis, said rotor having an annular top plate arranged immediately adjacent to said top wall of said cylindrical chamber and provided with a concentric opening permanently communicating during rotation of said rotor with said opening in said top wall of said cylindrical chamber, a plurality of vertically extending vanes secured at their upper ends to said annular top plate of said rotor and reaching with their bottom ends into said cylindrical tank, and a bottom plate forming also part of said rotor and secured to the bottom ends of said vanes located within said tank below the upper end thereof, said rotor having a diameter which is substantially smaller than the diameter of said cylindrical chamber so as to form an annular space between itself and the cylindrical walls of said cylindrical chamber and cylindrical tank so that said annular space extends by a substantial distance into said cylindrical tank, said arrangement of the rotor resulting in exhaust of gases from the uppermost portion of said tank where said gases contain the least amount of foam and in projection by the bottom plate of said rotor of the liquid formed in the rotor by breaking up of the foam along a substantially horizontal slightly downward inclined path near the upper end of said tank, so that said liquid particles form a liquid umbrella-shaped layer within said tank between said rotor and the interior of said tank, partially retaining the foam in said tank and thereby reducing the amount of foam entering said rotor; and means for rotating said rotor.

6. A defoaming device comprising, in combination, a cylindrical tank, a cylindrical chamber arranged at the upper end of said tank and having a smaller diameter than said tank; a top wall closing the upper end of said cylindrical chamber and having an opening formed therein and arranged eccentrically close to the center of said top wall; a rotor arranged partly in said cylindrical chamber and partly in said cylindrical tank rotatably about a vertical axis, said rotor having an annular top plate arranged immediately adjacent to said top wall of said cylindrical chamber and provided with a concentric opening permanently communicating during rotation of said rotor with said opening in said top wall of said cylindrical chamber, a plurality of vertically extending vanes secured at their upper ends to said annular top plate of said rotor and reaching with their bottom ends into said cylindrical tank, and a bottom plate forming also part of said rotor and secured to the bottom ends of said vanes located within said tank below the upper end thereof, said bottom plate having a diameter which is substantially greater than the diameter of said top plate, so that said bottom plate protrudes a substantial distance beyond said top plate, said rotor having a diameter which is substantially smaller than the diameter of said cylindrical chamber so as to form an annular space between itself and the cylindrical walls of said cylindrical chamber and cylindrical tank so that said annular space extends by a substantial distance into said cylindrical tank, said arrangement of the rotor resulting in exhaust of gases from the uppermost portion of said tank where said gases contain the least amount of foam and in projection by the bottom plate of said rotor of the liquid formed in the rotor by breaking up of the foam along a substantially horizontal slightly downward inclined path near the upper end of said tank, so that said liquid particles from a liquid umbrella-shaped layer within said tank between said rotor and the interior of said tank, partially retaining the foam in said tank and thereby reducing the amount of foam entering said rotor; and means for rotating said rotor.

7. A defoaming device comprising, in combination, a tank; a chamber arranged at the upper end of said tank; a top wall closing the upper end of said chamber and having an opening formed therein; a rotor arranged partly in said chamber and partly in said tank rotatably about a vertical axis, said rotor having a top plate arranged adjacent to said top wall of said chamber and provided with an opening permanently communicating during rotation of said rotor with said opening in said top wall of said chamber, a plurality of vertically extending vanes secured at their upper ends to said top plate of said rotor and reaching with their bottom ends into said tank, and a bottom plate forming also part of said rotor and secured to the bottom ends of said vanes located within said tank below the upper end thereof; means for rotating said rotor; conduit means leading from the lower portion of said tank into said rotor so as to be adapted to carry fluid contained in said tank into said rotor and onto said bottom plate thereof; and pumping means associated with said conduit means for pumping fluid contained in said tank into said conduit means.

8. A defoaming device comprising, in combination, a tank; a top wall closing the upper end of said tank and having an opening formed therein; a rotor arranged in the region of said top wall of said tank rotatably about a vertical axis, said rotor having a top plate arranged adjacent to said top wall of said tank and provided with an opening permanently communicating during rotation of said rotor with said opening in said top wall of said tank, vertically extending vane means secured at their upper ends to said top plate of said rotor, and a bottom plate forming also part of said rotor and secured to the bottom of said vane means; means for rotating said rotor; conduit means leading from the lower portion of said tank into said rotor so as to be adapted to carry fluid contained in said tank into said rotor and onto said bottom plate thereof; and pumping means associated with said conduit means for pumping fluid contained in said tank into said conduit means.

9. A defoaming device according to claim 8 in which said vane means consist of a plurality of vertically extending vanes secured at their upper ends to the top plate of the rotor and at their bottom ends to the bottom plate of the rotor.

10. A defoaming device according to claim 8 in which said vane means consist of a metal sheet cylinder having substantially vertical slots and swayed louvers.

11. A defoaming device according to claim 8 in which said vane means consist of a metal sheet cylinder having substantially vertical and horizontal slots and swayed louvers.

12. A defoaming device according to claim 8 in which said bottom plate projects in lateral direction beyond said vane means so as to form an annular projecting bottom plate portion and in which said conduit means leading from the lower portion of the tank into the rotor are shaped so as to carry fluid contained in said tank onto said annular projecting bottom plate portion.

13. A defoaming device according to claim 8 in which said conduit means include a circular perforated pipe arranged surrounding the rotor and substantially above the annular projecting bottom plate portion so as to spray the fluid carried from the tank onto said annular projecting bottom plate portion.

ROBERT MAURICE MERCIER.

REFERENCES CITED

The following references are of record in the file of this patent:

UNITED STATES PATENTS

| Number | Name | Date |
| --- | --- | --- |
| 1,316,947 | Wirth-Frey | Sept. 23, 1919 |
| 1,806,698 | Miller | May 26, 1931 |
| 1,811,513 | Mason | June 23, 1931 |
| 1,847,648 | Harkom | Mar. 1, 1932 |
| 1,921,725 | Boutet | Aug. 8, 1933 |
| 1,967,938 | Jantzen | July 24, 1934 |
| 1,993,944 | Peebles | Mar. 12, 1935 |
| 2,490,421 | Denhard | Dec. 6, 1949 |

FOREIGN PATENTS

| Number | Country | Date |
| --- | --- | --- |
| 92,573 | Switzerland | Jan. 16, 1922 |